United States Patent Office 3,441,485
Patented Apr. 29, 1969

3,441,485
RECOVERY OF STREAMS FROM A FEED
BY DISTILLATION
Maurice W. Jones, Bartlesville, Okla., assignor to Phillips
Petroleum Company, a corporation of Delaware
Filed Dec. 24, 1964, Ser. No. 421,158
Int. Cl. B01d 3/42, 3/26
U.S. Cl. 203—99                                    2 Claims

ABSTRACT OF THE DISCLOSURE

Method for distillation of a feed comprising at least two vaporizable components and a relatively non-vaporizable component comprising feeding feed into an upper portion of a distillation column, taking an overhead vaporous stream containing substantially all of one of the two vaporizable components, together with a portion of the other of the vaporizable feed components, taking a vapor stream of the other vaporizable components from an intermediate portion of the column and removing from the bottom of the column a liquid containing said relatively non-vaporizable component. In one embodiment the stream contains n-hexane solvent, water and 2,6-ditertiary-butyl-4-methyl phenol. Water is taken off as overhead, substantially dehydrated n-hexane is taken off as a side stream and the 2,6-ditertiary-butyl-4-methyl phenol is removed.

---

Figure 1:
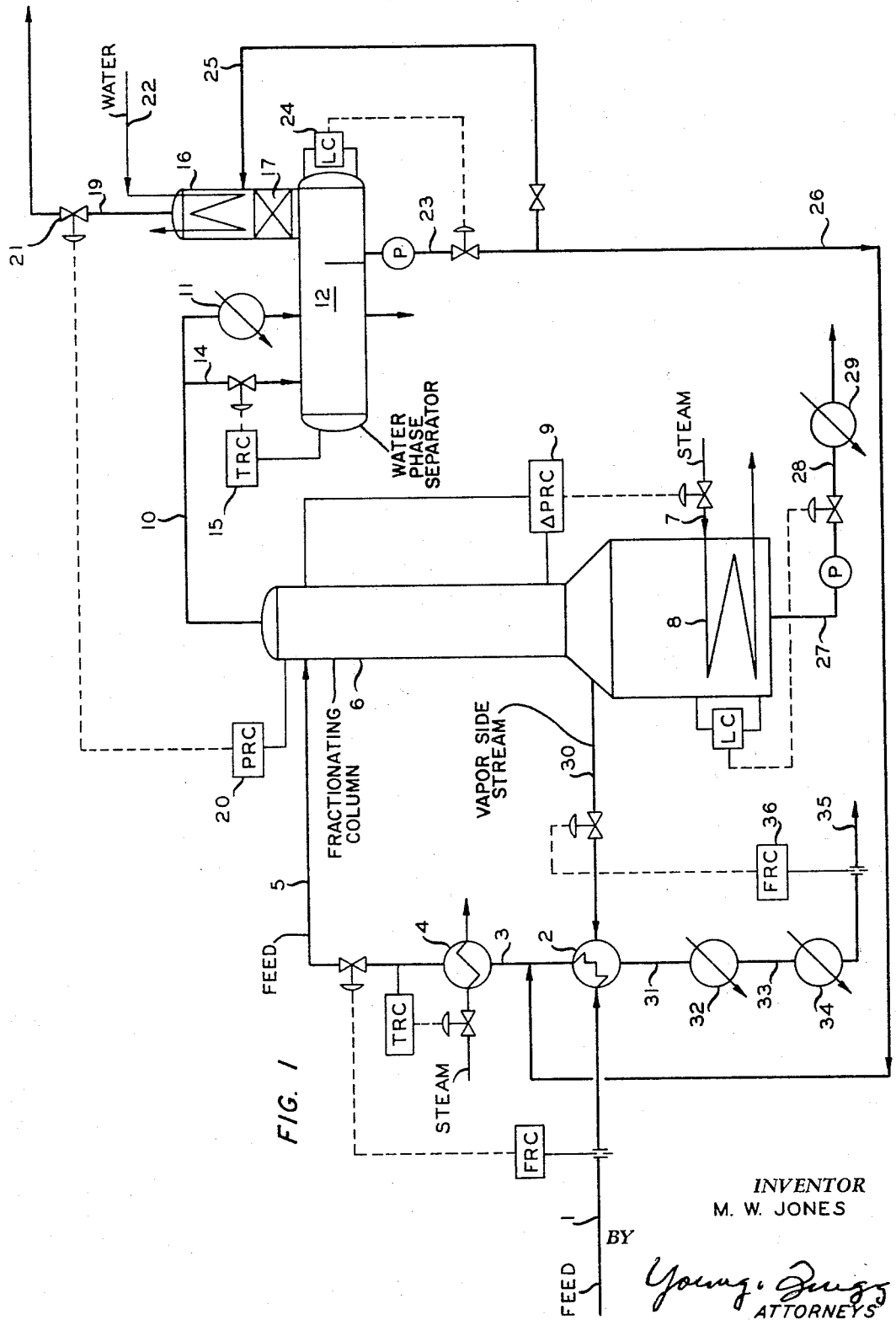

This invention relates to recovery of streams by distillation. In one of its aspects, the invention relates to the recovery of several streams from a feed by distillation of the feed in a single distillation zone or column by feeding said feed into an upper portion of said column or zone and obtaining from said zone an overhead vapor, from a point below the point of feed to said zone, a vaporous sidestream and from a bottom portion of said zone a liquid kettle product. In another of its aspects, as it relates to a specific embodiment of the invention in connection with which it is later described, the invention recovers a chemical ingredient, such as a short-stopping agent, from a diluent used in catalytic polymerization, normal hexane in the specific embodiment, by feeding to the distillation set out herein a feed stream containing water, the short-stopping ingredient or agent and normal hexane and separating the feed in the column into an overhead containing water vapor and some hexane vapor, thus dehydrating the used solvent, removing from a mid-portion of the column below the point of feed a dehydrated normal hexane vapor sidestream and, from the bottom of the column, a liquid stream containing some normal hexane and the said agent. In a further aspect of the invention, still as it may be viewed in connection with the specific embodiment set out herein, the overhead vapors which contain the water and normal hexane are passed to a condensing section or zone and therefrom to an accumulator in which condensed water is removed and the hydrocarbon phase recovered and returned to the distillation while non-condensed vapor is vented in a manner and at a rate sufficient to maintain the distillation overhead pressure. In a further aspect of the invention, the heat requisite for the distillation is transmitted to the distillation zone, still as viewed in connection with the specific embodiment set out herein, by means of a heating means controlled responsive to the pressure differential in the distillation zone or column determined over a portion thereof located substantially above the vaporous solvent sidestream removal level.

There are known a number of polymerization and other operations in which there are employed catalytic or other ingredients, including agents employed to modify and/or to short-stop reactions. In such operations, considerable quantities of solvents are employed. These solvents must be periodically or cyclically regenerated and, in such regeneration, there must be removed from such solvents water which unavoidably enters into the system and, of course, chemical ingredients, such as short-stopping agents. such removal must be practiced with a high degree of efficiency, yet at reasonable cost in order that the solvent can be re-employed for further catalytic operation. Thus, there are a considerable number of operations in which it is not only desirable but absolutely necessary to cyclically or to at least periodically dehydrate solvents employed in catalytic reactions. If chemical agents have been added, such as compounds used to stabilize a reactor effluent until it can be treated for recovery of desirable product therefrom, as in the case of the utilization of anti-oxidants which are added to the effluent from a reactor, or in which operations there have been utilized so-called short-stopping agents, it is necessary that these be removed from the solvent before it is recycled into the reaction zone or reactor.

In the past, it has been customary to dehydrate solvents before recycling the same to the reactor by a distillation of the mixture containing the solvent. It has also been customary to distill the solvent from the anti-oxidants or short-stopping agents or other chemical ingredients. These distillations have been performed in separate operations.

I have now conceived of a considerably simplified or compacted operation wherein water of hydration and the solvent are recovered, both of them, as vapors in separate streams. As a bottoms of kettle product, there is recovered the chemical ingredient from which formerly the solvent has been removed as a vapor in a separate distillation operation. Thus, according to my concept, moisture is stripped from the hydrocarbons as an overhead vapor, solvent is removed from the column in the form of vapor, as a sidestream, and a concentrated solution of the chemical ingredient or agent is withdrawn from the kettle of the single column or zone employed.

In one system of operation, heat to the distillation column is controlled by sensing the pressure at the top of the column and at a point above the removal of the sidestream, but below the feed to the column and the pressure differential between these points is employed to regulate the amount of heat entering the column kettle. The pressure in the top of the column is regulated by withdrawing non-condensables from the system to maintain a pressure which is desired in said top of the column. Patent 2,988,-894, J. Van Pool and H. R. Sharp, issued June 20, 1961, describes and claims such a control which, in effect, is a method for removing from a fractionation or distillation system a gas or vapor which accumulates therein.

It is an object of this invention to provide for the recovery of certain streams from a feed by a distillation operation. It is another object of this invention to provide for the distillation treatment of solvents. It is a further object of this invention to provide a method and/or an apparatus for recovery of chemical agents, such as inhibitors or reaction-arresting ingredients, from a solvent employed in catalytic reactions. It is a still further object of the invention to provide a method and/or an apparatus wherein solvents used in the polymerization of compounds to form plastics or synthetic rubber can be effectively treated to recover therefrom components which are undesirable in the reaction zone and which, if not recovered, would be returned to the reaction zone when the solvent is reused for further production of desired product. Yet another object of the invention is to provide apparatus means, including control means, for the automatic operation of a solvent treating and recovery system.

Other aspects, objects and the several advantages of the invention are apparent from a study of this disclosure, the drawing and the appended claims.

According to the present invention, there is provided a method for the distillation of a feed material containing at least two vaporizable components and a relatively non-vaporizable component which comprises feeding said material to an upper portion of a distillation column, taking overhead vapor stream from said column containing substantially all of one of said two vaporizable components and a portion of at least one other of said vaporizable components, from an intermediate portion of said column below the feed to said column drawing off a vaporous stream of said at least one other of said vaporizable components, and withdrawing from the bottom of said column a liquid stream containing said relatively non-vaporizable component.

Figure 2:
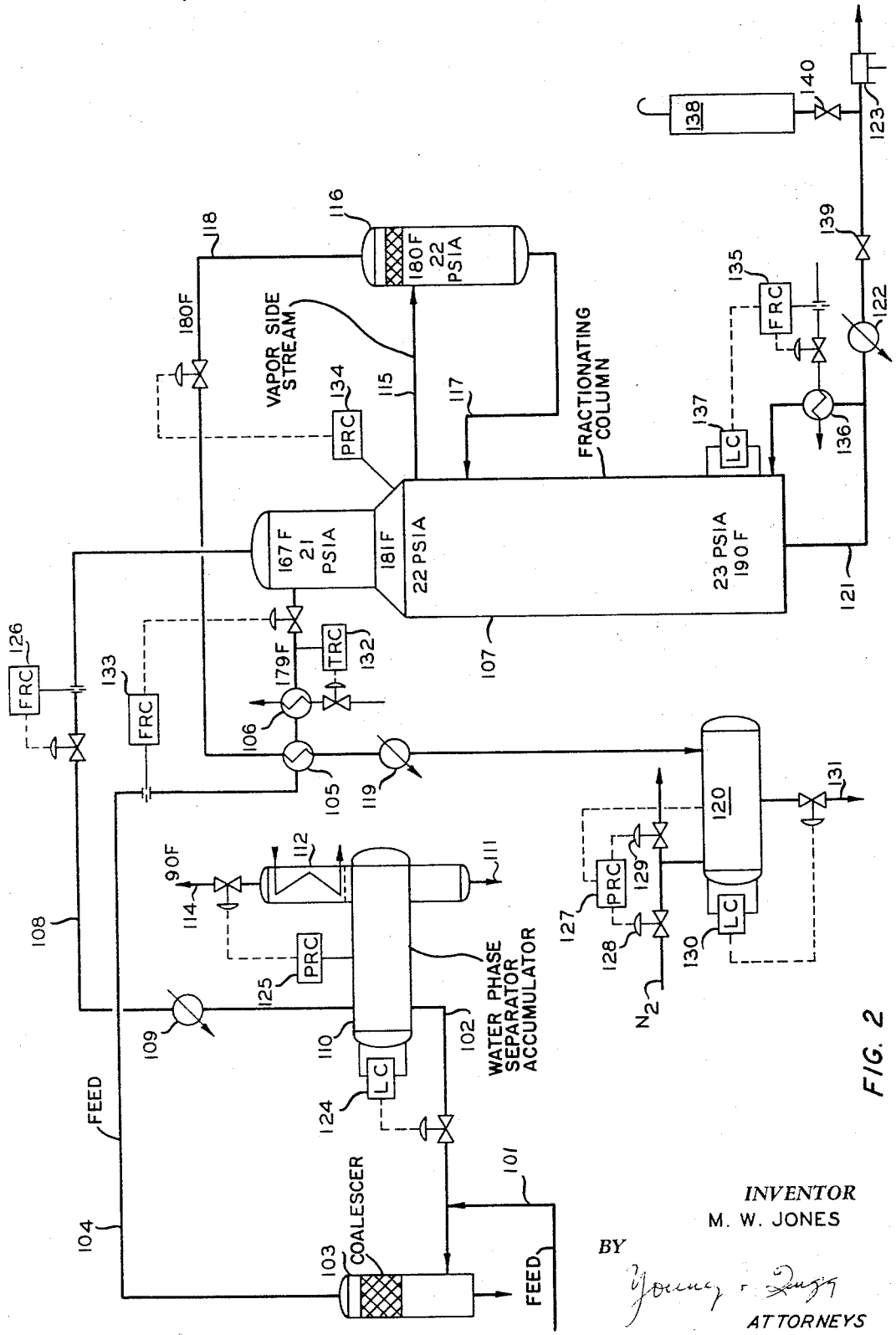

FIGURES 1 and 2 of the drawings show two different embodiments of the invention. FIGURE 2 shows, additionally to the tower and accumulator of FIGURE 1, among the features there illustrated, coalescers, certain different controls and a solvent accumulator.

Referring now to FIGURE 1 of the drawings, the invention is described with said embodiment wherein a normal hexane solvent containing water and 2,6-ditertiary-butyl-4-methyl phenol is treated in a single zone by distillation to recover dehydrated, purified solvent suitable for reuse as in the polymerization of a monomer or comonomers in the production of a synthetic rubber.

In FIGURE 1 of the drawing, the used hexane solvent feed is passed by 1 through heat exchanger 2, 3 and heat exchanger 4 and, finally, by 5 into column 6. Water vapor and some hexane vapor are taken off overhead and are passed by 10 through heat exchanger-cooler-condenser 11 into accumulator 12. A portion of the overhead is by-passed by 14 controlled by temperature recorder-controller 15 to maintain a suitable temperature in accumulator 12.

In accumulator 12, a water phase is separated and removed by way of water drain, as shown, and thus from the system. Hydrocarbon phase is decanted over the weir in the accumulator and is passed by 23 and pumped by 26 into admixture with the feed to column 6. A portion of this hydrocarbon phase is pumped by 25 to scrub vapors rising through packing 17 in condenser 16 from which non-condensables are removed through control take-off pipe 19. The pressure in tower 6 is maintained by pressure recorder-controller 20 which operates upon valve 21 in pipe 19.

Heat is supplied to column 6 by way of pipe 7 and coil 8, to which steam is fed responsive to the pressure differential as determined and transmitted by differential pressure recorder-controller 9. Pressure recorder-controller 9 operates upon pressures sensed in the top portion of the column and at a point above the removal of vaporous solvent as a sidestream through 30. The removed vaporous solvent is heat interchanged with the feed in heat exchanger 2 and is then passed by 31 through water cooler 32 and, if desired, additional water cooler 34 by way of 33 and removed from the operation at 35 for reuse as desired. The liquid level in the kettle of tower 6 is maintained by way of a liquid level controller operative upon a valve in bottoms withdrawal 27, the bottoms being pumped by way of said valve and 28 through water cooler 29 and from the system. All of the 2,6-ditertiary-butyl-4-methyl phenol is recovered in the bottoms passing from the system by 28.

The following table gives a heat and material balance for the operation in connection with which the drawing has just been described.

HEAT AND MATERIAL BALANCE

|  | 1 Feed to Fd.-Sd. Exchanger | 3 Feed to Preheater | 5 Feed to Column | 28 Kettle Product to Cooler | 29 Exit Kettle Product to Storage | 30 n-C$_6$ Vapor to Fd.-Sd. Exchanger | 31 n-C$_6$ to Condenser | 33 n-C$_6$ to Cooler | 35 n-C$_6$ to Storage |
|---|---|---|---|---|---|---|---|---|---|
| Components (mols/day): |  |  |  |  |  |  |  |  |  |
| Water | 20.65 | 20.65 | 20.65 |  |  | (1) | (1) | (1) | (1) |
| Acetylene | .04 | .81 | .81 |  |  |  |  |  |  |
| Butylene | 2.05 | 41.40 | 41.40 |  |  |  |  |  |  |
| Normal Hexane | 5,420 | 6,379.88 | 6,379.88 | 50. | 50. | 5,320 | 5,320 | 5,320 | 5,320 |
| Ethyl Benzene | 1.05 | 1.05 | 1.05 | .71 | .71 | .34 | .34 | .34 | .34 |
| Ionol (2,6-ditertiary-butyl-4-methyl phenol) | .21 | .21 | .21 | .21 | .21 | (1) | (1) | (1) | (1) |
| Total Mols/day | 5,444 | 6,444. | 6,444. | 50.92 | 50.92 | 5,320.34 | 5,320.34 | 5,320.34 | 5,320.34 |
| Pounds/day | 467,697 | 552,646 | 552,646 | 4,430 | 4,430 | 458,464 | 458,464 | 458,464 | 458,464 |
| S.c.f.d | | | 206,594 | | | 2,109,020 | 1,464,070 | | |
| G.p.d. at 60° F | 84,615 | 100,031 | 91,905 | 795 | 795 | | 22,792 | 82,950 | 82,950 |
| Sp. Gr. at 60° F | .6625 | .661 | .664 L-2.975 V | .6679 | .6679 | .664 | .664 | .664 | .664 |
| Density #/ft.$^3$ at 60° F | 41.34 | 41.24 | 41.33 L-.220 V | 41.68 | 41.68 | .227 | 41.43 L-.227 V | 41.43 | 41.4 |
| Pressure, p.s.i.a | 50 | 45 | 35 | 40 | 38 | 20 | 17 | 16 | 36 |
| Temperature, °F | 100 | 160 | 175 | 178 | 100 | 177 | 177 | 177 | 100 |
| Heat Content 1,000 B.t.u | 57,462 | 72,366 | 77,291 | 679 | 469 | 131,121 | 116,217 | 71,467 | 49,963 |

|  | 10 OH to Condenser | 11 Exit OHL to Accumulator | 19 OHP to Flare | 23 Reflux Liquid to Pump | 26 Reflux to Feed Preheater | 25 Reflux to Accum. Scrubber | Steam to Feed Preheater | 7 Steam to Kettle Element | Water to Drain |
|---|---|---|---|---|---|---|---|---|---|
| Components (mols/day): |  |  |  |  |  |  |  |  |  |
| Water | 20.65 | 20.65 |  |  |  |  |  |  | 20.65 |
| Acetylene | .81 | .81 | .04 | .77 | .77 |  |  |  |  |
| Butylene | 41.40 | 41.40 | 2.05 | 39.35 | 39.35 |  |  |  |  |
| Normal Hexane | 1,009.88 | 1,009.88 | 50. | 1,009.88 | 959.88 | 50 |  |  |  |
| Ethyl Benzene |  |  |  |  |  |  |  |  |  |
| Ionol (2,6-ditertiary-butyl-4-methyl phenol) |  |  |  |  |  |  |  |  |  |
| Total mols/day | 1,072.74 | 1,072.74 | 52.09 | 1,050. | 1,000. | 50 | 3,690 | 4,263 | 20.65 |
| Pounds/day | 89,739 | 89,739 | 4,425 | 85,314 | 84,949 | 4,309 | 66,480 | 76,800 | 372 |
| S.c.f.d | 407,094 | | 19,768 | | | | | | |
| G.p.d. at 60° F | | 16,252 | | 16,184 | 15,416 | 780 | | | |
| Sp. Gr. at 60° F | 2.89 | .662 | 2.933 | .661 | .66 | .661 | 1 | 1 | 1 |
| Density #/ft.$^3$ at 60° F | .22 | 41.30 | .224 | 41.25 | 41.22 | 41.25 | 62.4 | 62.4 | 62.4 |
| Pressure, p.s.i.a | 20 | 19 | 18 | 19 | 70 | 70 | 150 | 150 | 100 |
| Temperature, °F | 175 | 160 | 160 | 160 | 160 | 160 | 385 | 385 | 160 |
| Heat Content 1,000 B.t.u | 24,626 | 11,784 | 351 | 10,560 | 10,057 | 503 |  |  | 48 |

[1] 5 p.p.m.

Referring now to FIGURE 2 of the drawings, hydrocarbons consisting mostly of normal hexane are passed through line 101, line 102, coalescer 103, line 104, heat exchanger 105, and heat exchanger 106 into fractionator 107. Over-head vapors are passed through line 108 and heat exchanger 109 into accumulator 110. Water is withdrawn from accumulator 110 through line 111. Vapors pass from accumulator 110 through packed column 112, which is water cooled, and out through line 114. A sidedraw of vapors is passed through line 115 from fractionator 107 into coalescer 116. Liquid from coalescer 116 flows through line 117 into fractionator 107. The vapors from coalescer 116 pass through line 118, heat exchanger 105, heat exchanger 119 and into accumlator 120. A kettle product is passed from fractionator 107 through line 121, heat exchanger 122, and pump 123. Hydrocarbons from accumulator 110 are passed through line 102.

The rate of flow of hydrocarbons through line 102 is controlled by LLC–124. The pressure in accumulator 110 is controlled by PRC–125, which regulates the rate of flow of vapors through line 114. FRC–126 controls the rate of flow of overhead vapors from fractionator 107 through line 108. PRC–127 controls the pressure in accumulator 120. When the pressure is below a predetermined value, motor valve 128 is opened to allow nitrogen to flow into accumulator 120. When the pressure in accumulator 120 becomes greater than that of a second higher predetermined value, PRC–127 opens valve 129 to vent vapors from accumulator 120. LLC–130 regulates the rate of flow of normal hexane through line 131 from accumulator 120. TRC–132 controls the rate of steam added to heat exchanger 106 to control the temperature of the feed into fractionator 107. FRC–133 controls the rate of flow of feed through line 104 into fractionator 107. PRC–134 controls the rate of flow of vapors through line 118 to maintain a predetermined pressure in fractionator 107. FRC–135 controls the rate of flow of steam through reboiler 136. LLC–137 resets FRC–135. Calibration tube 138 is used to calibrate pump 123. Periodically, valve 139 is closed and valve 140 is opened. The time required for the level to fall in tube 138 is used to calibrate pump 123. The column in this example is dimensioned as follows: upper portion 2′ x 44′, lower portion 44″ x 20′. The column contains sieve-type trays.

The table below indicates flow rates in the operation of the plant of FIGURE 2.

|  | Line 101 Pounds per day | Line 102 Pounds per day | Line 131 Pounds per day |
| --- | --- | --- | --- |
| Butadiene | 97 | 5,944 | 1 |
| Butene | 1,256 | 13,873 | 9 |
| Normal hexane | 690,256 | 127,320 | 684,626 |
| Anti-oxidant | 68 | | |
| Fatty acid | 1 | | |
| Water | 459 | 1 | |
| Nitrogen | 375 | 35 | |

|  | Line 101 | Line 102 | Line 131 |
| --- | --- | --- | --- |
| Total g.p.d | 130,016 | 27,509 | 128,380 |

By the operation of the invention, as described in connection with the drawing, the water content of the normal hexane can be reduced at least to a maximum of 5 parts per million. The normal hexane solvent is substantially completely freed from the additive and there is removed from the column as a side vapor draw-off a dried normal hexane.

It will be evident to one skilled in the art of distillation having studied this disclosure, the drawing and the claims that the invention being one of physical nature has application to a wide variety of distillable mixtures. There is ever-pressing need, indeed, increasingly so, for more economically designed structures or operations in which large quantities of used materials, such as solvents, must be purified for reuse to meet the ever-increasing competition which are free enterprise economy demands. The present invention, in its various particulars or aspects, provides a unitary combination operation not only for the dehydration of the solvent but also for the recovery therefrom simultaneously of the additive or shortstop or other agent which must be used before the product can be separated from the reaction mass.

Reasonable variation and modification are possible within the foregoing disclosure, the drawing and the appended claims to the invention the essence of which is that, in the distillation of a feed material containing several components, there is obtained overhead a vaporous component, there is removed as a side draw-off a further vaporous component substantially free from at least an ingredient of the overhead vaporous component and a bottoms product which is obtained as a liquid and contains a relatively non-vaporizable component; further certain controlled operations to effect the invention in preferred manners have been set forth.

I claim:

1. A method for recovering dehydrated n-hexane solvent free from 2,6-ditertiary-butyl-4-methyl phenol agent added thereto at the completion of a polymerization reaction in which a synthetic rubber is formed so that the recovered solvent can be again used in said reaction which comprises feeding the solvent to an upper portion of a distillation column, taking an overhead from said column containing water vapor and a portion of vaporous n-hexane, from an intermediate portion of said column below the feed drawing off a vaporous stream containing another portion of n-hexane which now is dehydrated, and withdrawing from the bottom of said column a liquid stream containing some n-hexane and containing said 2,6-ditertiary-butyl-4-methyl phenol.

2. A method for recovering dehydrated n-hexane solvent free from 2,6-ditertiary-butyl-4-methyl phenol added thereto at the completion of a chemical reaction so that the recovered n-hexane solvent can be again used which comprises feeding said n-hexane solvent as obtained from said chemical reaction and containing said 2,6-ditertiary-butyl-4-methyl phenol and water to an upper portion of a distillation column, taking an overhead from said column containing water vapor and a portion of vaporous n-hexane solvent, from an intermediate portion of said column below the feed drawing off a vaporous stream containing another portion of said n-hexane solvent in dehydrated condition and withdrawing from the bottom of said column a liquid stream containing said 2,6-ditertiary-butyl-4-methyl phenol.

References Cited

UNITED STATES PATENTS

| 2,411,808 | 11/1946 | Rupp et al. | 203—71 X |
| 2,426,706 | 9/1947 | Patterson | 203—75 X |
| 2,467,174 | 4/1949 | Wilson | 203—2 |
| 2,732,414 | 1/1956 | Stoops | 202—160 X |
| 2,868,701 | 1/1956 | Berger | 202—160 X |
| 2,881,118 | 4/1959 | Spann et al. | 202—160 |
| 2,994,643 | 8/1961 | Smalling | 203—2 X |
| 2,730,558 | 1/1956 | Gerhold | 202—160 X |
| 2,368,497 | 1/1945 | Shipley et al. | 203—14 X |
| 2,473,203 | 6/1949 | Howe | 203—9 |
| 2,957,855 | 10/1960 | McLeod | 260—94.7 X |
| 3,177,166 | 4/1965 | Gregory et al. | 260—94.7 X |
| 3,190,868 | 6/1965 | Mitacek et al. | 260—94.7 X |

WILBUR L. BASCOMB, JR., *Primary Examiner.*

F. E. DRUMMOND, *Assistant Examiner.*

U.S. Cl. X.R.

203—2, 8, 14; 260—45.95, 94.7